United States Patent
Faunce et al.

(10) Patent No.: US 7,343,369 B2
(45) Date of Patent: Mar. 11, 2008

(54) METHOD AND APPARATUS FOR PREDICTING SELECTIVITY OF DATABASE QUERY JOIN CONDITIONS USING HYPOTHETICAL QUERY PREDICATES HAVING SKEWED VALUE CONSTANTS

(75) Inventors: Michael S. Faunce, Rochester, MN (US); Shantan Kethireddy, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 10/992,400

(22) Filed: Nov. 18, 2004

(65) Prior Publication Data

US 2006/0106777 A1  May 18, 2006

(51) Int. Cl.
*G06F 7/00* (2006.01)

(52) U.S. Cl. .............................. 707/3; 707/4; 707/104; 707/100; 707/101; 707/200; 707/102; 707/2; 715/538

(58) Field of Classification Search ............... 707/3, 707/4, 102, 104, 2, 200, 100, 101; 715/538
See application file for complete search history.

(56) References Cited

U.S. PATENT DOCUMENTS

| | | | |
|---|---|---|---|
| 5,335,345 A | | 8/1994 | Frieder et al. |
| 5,721,896 A | | 2/1998 | Ganguly et al. |
| 7,136,850 B2 * | | 11/2006 | Keller et al. .................. 707/4 |
| 2003/0135485 A1 | | 7/2003 | Leslie |
| 2003/0229635 A1 * | | 12/2003 | Chaudhuri et al. ............ 707/6 |

OTHER PUBLICATIONS

C. A. Lynch, "Selectivity Estimation and Query Optimization in Large Databases with Highly Skewed Distributions of Column Values", Proceedings of the 14th Very Large Data Base Conference (1988).

* cited by examiner

*Primary Examiner*—Christian Chace
*Assistant Examiner*—Thu Nga Nguyen
(74) *Attorney, Agent, or Firm*—Roy W. Truelson (57) ABSTRACT

A database management system predicts a selectivity for database query conditions requiring a join of records from different tables. The system identifies at least one skewed value in a field specified in the join condition, and constructs, for each skewed value, a set of hypothetical query predicates in which the field specified in the join condition is replaced with a constant equal to the skewed value. The system then predicts the selectivity for the hypothetical predicates, using any appropriate prediction technique. The selectivities of the hypothetical predicates are used to predict a selectivity for the original query.

6 Claims, 7 Drawing Sheets

METHOD AND APPARATUS FOR PREDICTING SELECTIVITY OF DATABASE QUERY JOIN CONDITIONS USING HYPOTHETICAL QUERY PREDICATES HAVING SKEWED VALUE CONSTANTS

FIELD OF THE INVENTION

The present invention relates generally to digital data processing, and more particularly to the generation and execution of database queries in a digital computer system.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises hardware in the form of one or more central processing units (CPU) for processing instructions, memory for storing instructions and other data, and other supporting hardware necessary to transfer information, communicate with the external world, and so forth. From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed at which a computer system performs day-to-day tasks (also called "throughput") can be increased by making various improvements to the computer's hardware design, which in one way or another increase the average number of simple operations performed per unit of time. The overall speed of the system can also be increased by making algorithmic improvements to the system design, and particularly, to the design of software executing on the system. Unlike most hardware improvements, many algorithmic improvements to software increase the throughput not by increasing the average number of operations executed per unit time, but by reducing the total number of operations which must be executed to perform a given task.

Complex systems may be used to support a variety of applications, but one common use is the maintenance of large databases, from which information may be obtained. Large databases usually support some form of database query for obtaining information which is extracted from selected database fields and records. Such queries can consume significant system resources, particularly processor resources, and the speed at which queries are performed can have a substantial influence on the overall system throughput.

Conceptually, a database may be viewed as one or more tables of information, each table having a large number of entries (analogous to row of a table), each entry having multiple respective data fields (analogous to columns of the table). The function of a database query is to find all rows, for which the data in the columns of the row matches some set of parameters defined by the query. A query may be as simple as matching a single column field to a specified value, but is often far more complex, involving multiple tables, multiple field values and multiple logical conditions.

Execution of a query involves retrieving and examining records in the database according to some strategy. For any given logical query, not all query execution strategies are equal. Various factors may affect the choice of optimum query execution strategy. For example, where a logical AND (or logical OR) of multiple conditions is specified, the sequential order in which the conditions are evaluated can make a significant difference in the time required to execute the query. The sequential order of evaluation is significant because the first evaluated condition is evaluated with respect to all the records in a database table, but a later evaluated condition need only be evaluated with respect to the subset of records for which the first condition was true. Similarly, for a query involving multiple conditions conjoined by a logical OR, a later evaluated condition need only be evaluated with respect to the subset of records for which an earlier condition was false. Therefore, as a general rule, it is desirable to evaluate those conditions which are most selective (i.e., eliminate the largest number of records from consideration) first, and to evaluate conditions which are less selective later. Other factors, such as the availability of database indexes or the relative difficulty of evaluating various conditions, may also affect the choice of optimum execution strategy.

To support database queries, large databases typically include a query engine and/or query optimizer, which executes the queries according to some automatically determined query execution strategy, using the known characteristics of the database and other factors. For the reasons explained above, in order to determine an optimum execution strategy, it is desirable to know in advance the number of records selected by each condition. Unfortunately, this is generally impossible to determine precisely in advance, without actually evaluating the conditions (i.e., without performing the query). There are, however, certain techniques whereby a query engine or optimizer may estimate the number of responsive records without actually performing the query.

Large databases typically include various auxiliary data structures to support query execution, which may be used to estimate the number of responsive records. One such structure is an index. An index is a sorting of the records in one of the database tables according to the value(s) of a corresponding field or fields. For example, if the database table contains records about people, one of the fields may contain a birthdate and a corresponding index contains a sorting of the records by birthdate. If a query requests the records of all persons born before a particular date, the sorted index may be used to find the responsive records, without the need to examine each and every record to determine whether there is a match. Another index may contain a sorting of the records by last name. In a similar index or another index, it may be useful to sort on multiple fields, e.g., by last name and first name (the first name being used as a secondary sorting, only if the last names of multiple records are identical). A well-designed database typically contains a respective index for each field having an ordered value which is likely to be used in queries.

Another such auxiliary data structure is a frequent value list. A frequent value list contains a listing, for a particular database field in a particular table, of discrete values of the field and corresponding frequency of occurrence. A third such auxiliary data structure is a histogram, which records the values of an ordered database field corresponding to ordered subsets having approximately equal numbers of entries. A frequent value list and a histogram typically contain approximate values, derived using any of various conventional techniques.

Conventional auxiliary database structures and techniques provide some assistance in estimating numbers of responsive records to various query conditions, but they are far from ideal. One type of query condition which is particularly difficult to evaluate using conventional techniques is a join condition requiring a comparison of values from more than one table in the database. Conventional auxiliary data structures generally characterize a single table, and are optimally used to estimate responses to queries involving data in one table. When values from multiple tables are joined, the size of the response set can be unpredictable as a result of data skew, i.e., the fact that values in a particular field are not evenly distributed. In other words, where a database table contains many records having the same value for one of its fields, and a query condition involves a join of this field with a second field of a another table, it is difficult to predict how many records will match the query condition. If the responsive records from the second table do not match the frequently occurring value in the first table, there might be very few records meeting the join condition; if, on the other hand, even a small number of records from the second table matches the frequently occurring value in the first table, the result set could be very large.

The unpredictability of database join queries has long been recognized in the art, and various conventional techniques exist for estimating result set size for a join condition. For example, it is known to apply the join query condition to a small randomly sampled portion of the database and extrapolate a result set size from the result set of the sample. Unfortunately, these and other conventional techniques do not always produce accurate predictions, particularly where substantial data skew exists.

In order to improve the optimization of database queries, it would be desirable to provide more accurate predictions of the number of records responsive to a database query condition involving joins, and in particular, responsive to a join query condition where a joined value exhibits substantial data skew.

SUMMARY OF THE INVENTION

A database management system predicts a selectivity (which may be expressed as a proportion of records sets selected or a size of a result set) for a database query or subset of query conditions requiring a join of records from different database tables. The system identifies at least one skewed value in a first table for a field specified in the join condition. The system then constructs, for each skewed value, a set of hypothetical query predicates in which the field specified in the join condition is replaced with a constant equal to the skewed value. The system then predicts the selectivity of the hypothetical predicates, using any appropriate prediction technique. The selectivity of the hypothetical predicates are used to predict a selectivity for the original query.

In the preferred embodiment, the database management system maintains a respective frequent value list with respect to each of multiple database tables and fields. When an appropriate join condition is identified, the frequent value list for a table and field specified in the join condition is examined to determine whether any skewed values exist. A skewed value is identified as one exceeding a predetermined threshold, which can be a fixed constant, a ratio, or some other appropriate measure. However, other means might alternatively be used for identifying skewed values.

By identifying skewed values in a field specified in a join condition and separately predicting the result set sizes for the skewed values, as described herein with respect to the preferred embodiment, it is possible to more accurately predict the result set size of a query containing a join of data from multiple database tables. Moreover, in accordance with the preferred embodiment this predictive technique relies on conventional auxiliary data structures which already exist in many databases, and therefore does not require significant additional overhead for maintaining the database. Increased prediction accuracy improves the choice of optimum execution strategy, thus improving the utilization and performance of system resources in response to database queries.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
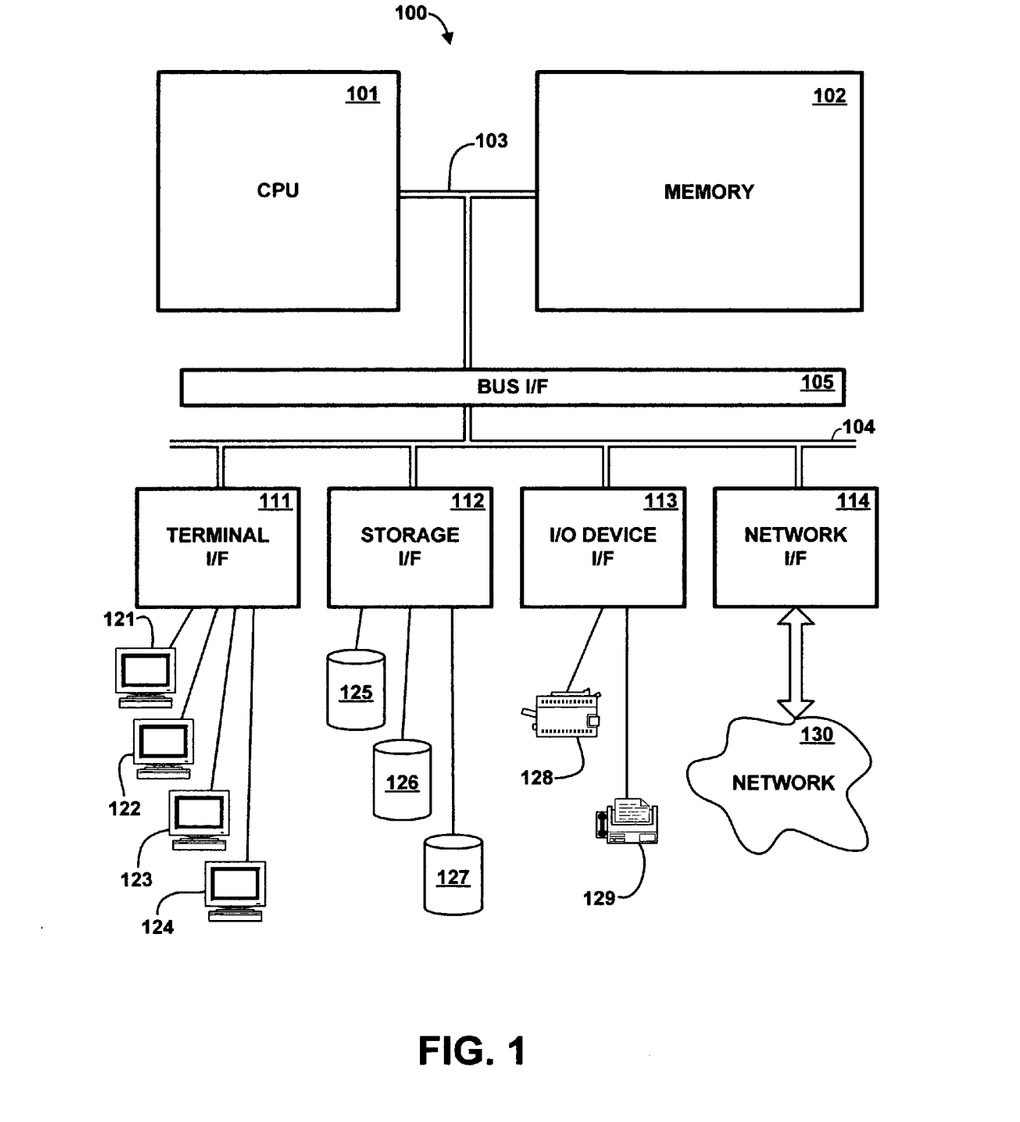
FIG. 1 is a high-level block diagram of the major hardware components of a computer system for determining query execution strategies and executing queries, according to the preferred embodiment of the present invention.

Referring to the Drawing, wherein like numbers denote like parts throughout the several views, FIG. 1 is a high-level representation of the major hardware components of a computer system 100 for determining query execution strategies by predicting the number of records responsive to join conditions in queries using hypothetical predicates having skewed value constants, according to the preferred embodiment of the present invention. CPU 101 is a general-purpose programmable processor which executes instructions and processes data from main memory 102. Main memory 102 is preferably a random access memory using any of various memory technologies, in which data is loaded from storage or otherwise for processing by CPU 101.

Memory bus 103 provides a data communication path for transferring data among CPU 101, main memory 102 and I/O bus interface unit 105. I/O bus interface 105 is further coupled to system I/O bus 104 for transferring data to and from various I/O units. I/O bus interface 105 communicates with multiple I/O interface units 111-114, which may also be known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to an external network 130 for communication with one or more other digital devices. Network 130 may be any of various local or wide area networks known in the art. For example, network 130 may be an Ethernet local area network, or it may be the Internet. Additionally, network interface 114 might support connection to multiple networks.

It should be understood that FIG. 1 is intended to depict the representative major components of system 100 at a high level, that individual components may have greater complexity than represented in FIG. 1, that components other than or in addition to those shown in FIG. 1 may be present, and that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among CPU 101, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicate with system 100 over network 130. Computer system 100 may alternatively be a single-user system, typically containing only a single user display and keyboard input. Furthermore, while the invention herein is described for illustrative purposes as embodied in a single computer system, the present invention could alternatively be implemented using a distributed network of computer systems in communication with one another, in which different functions or steps described herein are performed on different computer systems.

While various system components have been described and shown at a high level, it should be understood that a typical computer system contains many other components not shown, which are not essential to an understanding of the present invention. In the preferred embodiment, computer system 100 is a computer system based on the IBM AS/400™ or i/Series™ architecture, it being understood that the present invention could be implemented on other computer systems.

Figure 2:
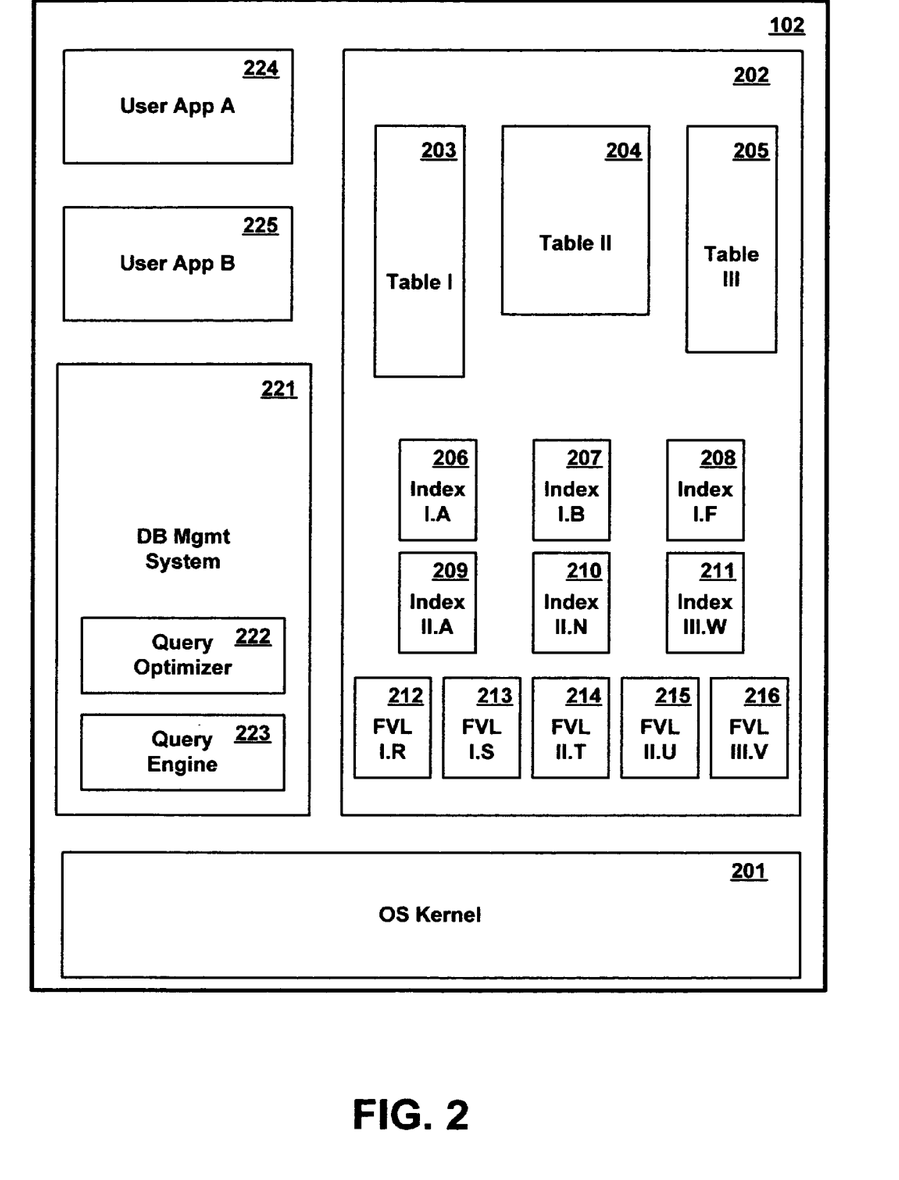
FIG. 2 is a conceptual illustration of the major software components of a computer system of FIG. 1, according to the preferred embodiment.

FIG. 2 is a conceptual illustration of the major software components of system 100 in memory 102. Operating system 201 provides various low-level software functions, such as device interfaces, management of memory pages, management and dispatching of multiple tasks, etc. as is well-known in the art. A structured database 202 contains data which is maintained by computer system 100 and for which the system provides access to one or more users, who may be directly attached to system 100 or may be remote clients who access system 100 through a network using a client/server access protocol. Database 202 of the preferred embodiment contains multiple database tables 203-205 (of which three are represented in FIG. 2). Each table 203-205 contains a plurality of records, each record containing at least one (and usually many) fields, as is well known in the art. Database 202 might contain almost any type of data which is provided to users by a computer system.

Associated with database 202 are various auxiliary data structures, of which two types are represented in FIG. 2 (although a typical large database will contain other auxiliary data structures not shown). These auxiliary data structures include multiple indexes 206-211 and multiple frequent value lists 212-216. Each index 206-211 and each frequent value list 212-216 is associated with a respective database table 203-205 and a respective field or fields within the associated database table. Each index represents an ordering of the records in the database table with which it is associated database according to the value of the associated field (in some cases, it might be ordered according to the values of multiple fields). Each frequent value list represents, for the associated database table, the frequency of occurrence of certain values within the associated field (or, in some cases, set of multiple fields). Although only one database 202 containing three tables 203-205, six indexes 206-211, and five frequent value lists 212-216, are shown in FIG. 2, the computer system may contain multiple databases, and the number of tables and auxiliary data structures may vary (and typically is much larger). Alternatively, database 202 on system 100 may be logically part of a larger distributed database which is stored on multiple computer systems.

Database management system 221 provides basic functions for the management of database 202. Database management system 221 may theoretically support an arbitrary number of databases, although only one is shown in FIG. 2. Database management system 221 preferably allows users to perform basic database operations, such as defining a database, altering the definition of the database, creating, editing and removing records in the database, viewing records in the database, defining database indexes, and so forth. Among the functions supported by database management system 221 is the making of queries against data in database 202. Query support functions in database management system 221 include query optimizer 222 and query engine 223. Database management system 221 may further contain any of various more advanced database functions. Although database management system 221 is represented in FIG. 2 as an entity separate from operating system kernel 201, it will be understood that in some computer architectures various database management functions are integrated with the operating system.

Query optimizer 222 generates query execution strategies for performing database queries. As is known in the database art, the amount of time or resource required to perform a complex query on a large database can vary greatly, depending on various factors, such as the availability of an index, the amount of resources required to evaluate each condition, and the expected selectivity (i.e., number of records eliminated from consideration) of the various logical conditions. Optimizer 222 determines an optimal execution strategy according to any optimizing algorithm, now known or hereafter developed, and generates an execution strategy, also known as an "access plan", according to the determination. The execution strategy is a defined series of steps for performing the query, and thus is, in effect, a computer program. The optimizer 222 which generates the execution strategy performs a function analogous to that of a compiler, although the execution strategy data is not necessarily executable-level code. It is, rather, a higher-level series of statements which are interpreted and executed by query engine 223.

A query can be saved as a persistent storage object in memory, and can be written to disk or other storage. Once created by optimizer 222, a query execution strategy can be saved with the query as part of the persistent storage object (not shown). For a given query, it is possible to generate and save one or multiple optimized execution strategies. The query can be invoked, and a saved query strategy re-used (re-executed), many times.

In addition to database management system 211, one or more user applications 224, 225 executing on CPU 101 may access data in database 202 to perform tasks on behalf of one or more users. Such user applications may include, e.g., personnel records, accounting, code development and compilation, mail, calendaring, or any of thousands of user applications. Some of these applications may access database data in a read-only manner, while others have the ability to update data. There may be many different types of read or write database access tasks, each accessing different data or requesting different operations on the data. For example, one task may access data from a specific, known record, and optionally update it, while another task may invoke a query, in which all records in the database are matched to some specified search criteria, data from the matched records being returned, and optionally updated.

Furthermore, data may be read from or written to database 202 directly, or may require manipulation or combination with other data supplied by a user, obtained from another database, or some other source. Although two applications 224, 225 are shown for illustrative purposes in FIG. 2, the number of such applications may vary. Applications 224, 225 typically utilize function calls to database manager 221 to access data in database 202, and in particular, to execute queries to data in the database, although in some systems it may be possible to independently access data in database 202 directly from the application.

Various software entities are represented in FIG. 2 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 2, it will be understood that the actual number of such entities may vary, and in particular, that in a complex database server environment, the number and complexity of such entities is typically much larger. Additionally, although software components 202-216 and 221-225 are depicted in FIG. 2 on a single computer system 100 for completeness of the representation, it is not necessarily true that all programs, functions and data will be present on a single computer system or will be performed on a single computer system. For example, user applications may be on a separate system from the database; a database may be distributed among multiple computer systems, so that queries against the database are transmitted to remote systems for resolution, and so forth.

While the software components of FIG. 2 are shown conceptually as residing in memory 102, it will be understood that in general the memory of a computer system will be too small to hold all programs and data simultaneously, and that information is typically stored in data storage devices 125-127, comprising one or more mass storage devices such as rotating magnetic disk drives, and that the information is paged into memory by the operating system as required. In particular, database 202 is typically much too large to be loaded into memory, and typically only a small portion of the total number of database records is loaded into memory at any one time. The full database 202 is typically recorded in disk storage 125-127. Furthermore, it will be understood that the conceptual representation of FIG. 2 is not meant to imply any particular memory organizational model, and that system 100 might employ a single address space virtual memory, or might employ multiple virtual address spaces which overlap.

Figure 3A:
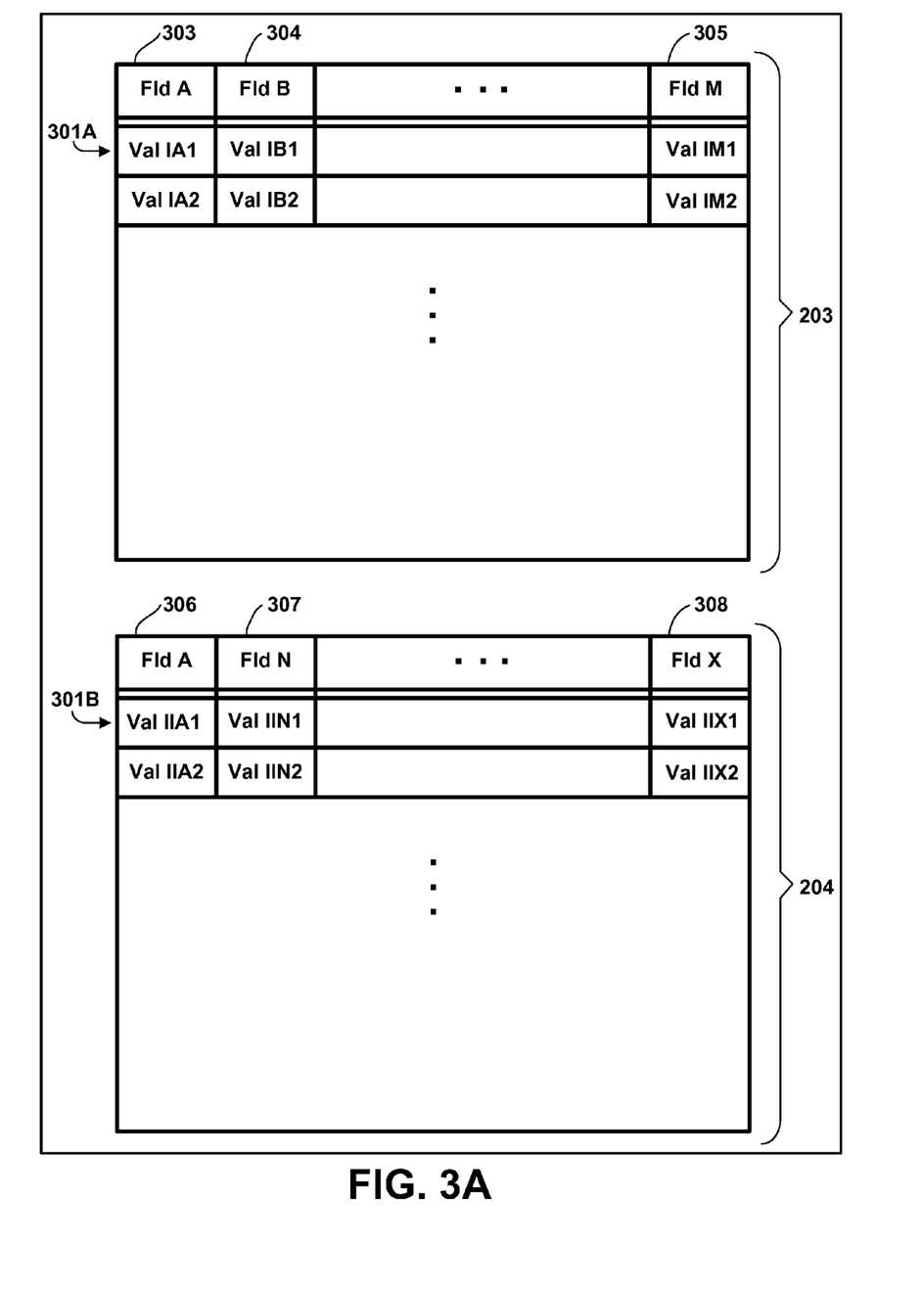
FIGS. 3A, 3B and 3C are a conceptual representation of the structure of a database containing multiple tables and certain auxiliary data structures, according to the preferred embodiment.
Figure 3B:
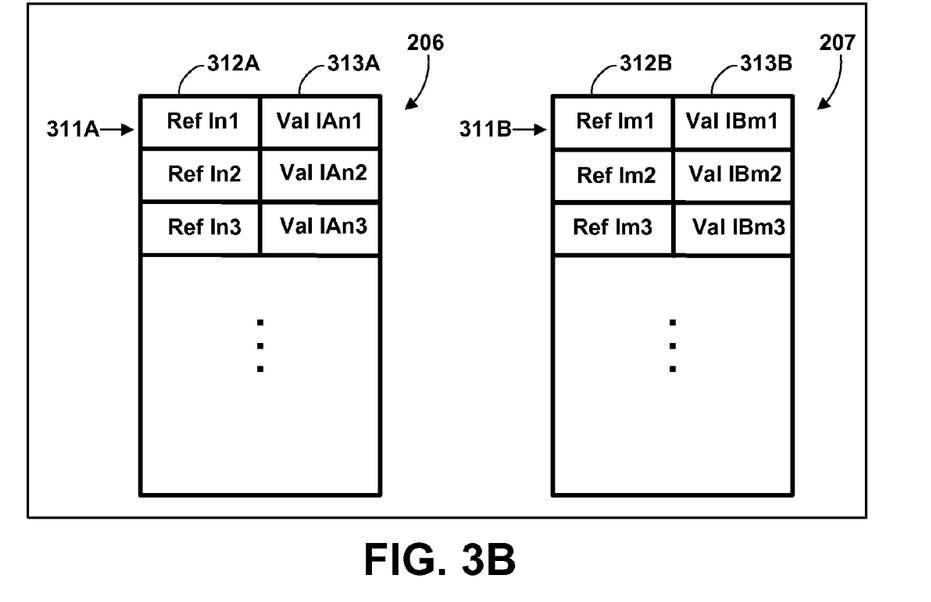
Figure 3C:
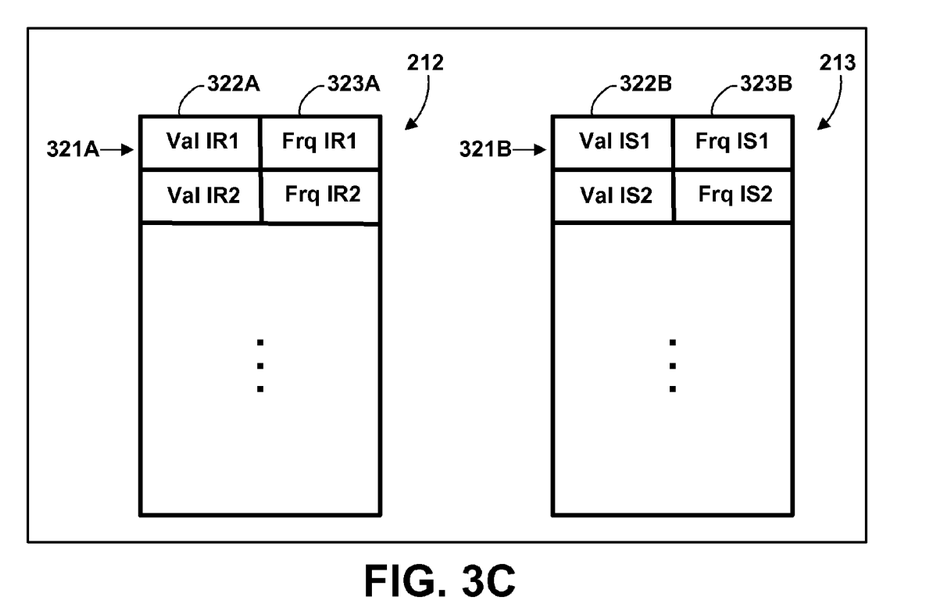

FIGS. 3A-3C are a conceptual representation of the structure of database 202 and certain associated data structures, according to the preferred embodiment. FIG. 3A represents the structure of database tables; FIG. 3B represents the structure of database indexes, and FIG. 3C represents the structure of frequent value lists. Referring to FIG. 3A, two database tables 203, 204 are represented, it being understood that the actual number of such tables may vary. Each table 203, 204 contains multiple database records 301A, 301B (herein generically referred to as feature 301), each record containing multiple data values logically organized as multiple data fields 303-308. Each table is conceptually represented in FIG. 3A as a table or array, in which the rows represent database records, and the columns represent data fields. However, as is well known in the art, the actual structure of the database table in memory typically varies due to the needs of memory organization, accommodating database updates, and so forth. A database table will often occupy non-contiguous blocks of memory; database records and individual fields within database records may vary in length; some fields might be present in only a subset of the database records; and individual records may be non-contiguous. Portions of the data may even be present on other computer systems. Various pointers, arrays, and other structures (not shown) may be required to identify the locations of different data contained in the database.

Different database tables typically contain different sets of fields. However, these sets may, and often do, overlap. I.e., it is frequently the case that a field from a first database table corresponds to a field in a second database table. As shown in FIG. 3A, table 203 contains a "field A" 303, which corresponds to a "field A" 306 in table 204. However, the remaining fields 304-305 of table 203 do not correspond to fields 307-308 in table 204.

Because a database table 203-205 may contain a very large number of records 301, and it is frequently necessary to access these records in some logical (sorted) order, database indexes 206-211 provide a pre-sorted ordering of the database records in a corresponding database table according to some logical criterion. Typically, an index sorts the database according to the value of a specific field or fields, the field(s) being used to sort the database varying with the index. FIG. 3B represents two indexes 206, 207, where index 206 sorts database records in table 203 according to the value of field A 303, and index 207 sorts database records in table 203 according to the value of field B 304.

Each index 206-211 is associated with a respective database table 203-205, and multiple indexes may be associated with the same table. Conceptually, each index contains a plurality of entries 311A, 311B (herein generically referred to as feature 311), each entry 311 corresponding to a respective entry 301 in a corresponding database table 203-205, and containing a reference 312A, 312B (herein generically referred to as feature 312) and a value 313A, 313B (herein generically referred to as feature 313. The reference 312 is a reference to the corresponding entry 301 in the database table with which the index is associated. A reference could be a pointer, array index, record number, etc., which enables one to identify and access the corresponding database entry. The value 313 is the value of the database table field sorted by the index in the corresponding entry from the database table. E.g., for index 206, which sorts database records according to the value of field A 303, the value 313A is the value of field A 303 for each corresponding database record. For an index, the entries are sorted so that values 313 are in a sorted order. Where multiple fields are used for sorting (e.g., where entries 311 are sorted according to the value of a first field, and if two entries have the same first field value, then according to the value of a second field), then each entry 311 further contains a second value (not shown) corresponding to the value from the second field). Although indexes 206, 207 are represented conceptually in FIG. 3B as tables or arrays, a different structure, such as a binary tree, is typically used due to the need to update the indexes responsive to database updates, and to quickly identify the location of a desired value in the sorted order.

In addition to using indexes to access data in a sorted order, it is frequently necessary for query purposes to estimate the number of records containing some specific value. For this purpose, database management system 221 maintains multiple frequent value lists (FVLs) 212-216. A frequent value list is associated with a particular database table and field or fields within that table, and contains a measure of frequency for one or more specific values of the associated field(s). FIG. 3C represents two FVLs 212, 213, where FVL 212 reflects frequency of value in field R of table 203 and FVL 213 represents frequency of values in field S of table 203.

Conceptually, each FVL 206-211 contains one or more entries 321A, 321B (herein generically referred to as feature 321), each entry 321 containing a value 322A, 322B (herein generically referred to as feature 322) and a measure of frequency 323A, 323B (herein generically referred to as feature 323. The value 322 is one of the values that the corresponding field in the corresponding database table may assume. The frequency 323 contains a relative measure of the frequency of occurrence of the value 322 in the same entry 321.

The primary purpose of an FVL is to estimate a number of records responsive to some query condition in order to select an optimal query strategy, and in general it is most useful in identifying situations in which a large number of records contain the same value. The measure of frequency 323 need not be, and typically is not, precise. In the preferred embodiment, the FVL is constructed and maintained by periodically sampling a random sample of records in the corresponding table and counting the number of occurrences of each sampled value. However, any alternative method for constructing FVL data could be used, including an actual count of frequency. This random sampling process is generally adequate to identify any frequently occurring values. However, the FVL is not a good measure of the frequency of occurrence for all values, particularly those which occur very infrequently. If, for example, a particular value occurs only once or a very small number of times among thousands of database records, the sampling technique for constructing the FVL might not find it at all. Because an FVL is primarily intended for identifying frequent values, the FVL might contain only values for which the frequency exceeds some pre-determined threshold. As in the case of the indexes, the FVL representation of FIG. 3C is a conceptual representation, and the actual data structure used may take a form other than a table or array.

In a well designed database, an index and FVL does not necessarily exist for every field and table, but only for those fields which justify the maintenance burden. An index is useful where a sorting relationship exists, and it is frequently necessary to access records in a sorted order, or to access a small number of records for a specific value or values. For some fields, it is unlikely that a useful sorting will exist. Similarly, some fields are intended to carry only infrequently occurring values, and for these fields an FVL makes no sense. For example, in a database of customers of a bank, one of the fields might carry the customer's account number. By its very nature, the account number should be unique, and therefore it makes no sense to maintain an FVL for a field of account numbers.

Among the functions supported by database management system 221 is the making of queries against data in database 202, which are executed by query engine 223. As is known, queries typically take the form of statements having a defined format, which test records in the database to find matches to some set of logical conditions. Typically, multiple terms, each expressing a logical condition, are connected by logical conjunctives such as "AND" and "OR". Because database 202 may be very large, having multiple database tables 203-205, some or all of which contain a very large number of records, and a query may be quite complex, involving multiple logical conditions, including join conditions which reference data in multiple tables, it can take some time for a query to be executed against the database, i.e., for all the necessary records to be reviewed and to determine which records, if any, match the conditions of the query.

Figure 4:
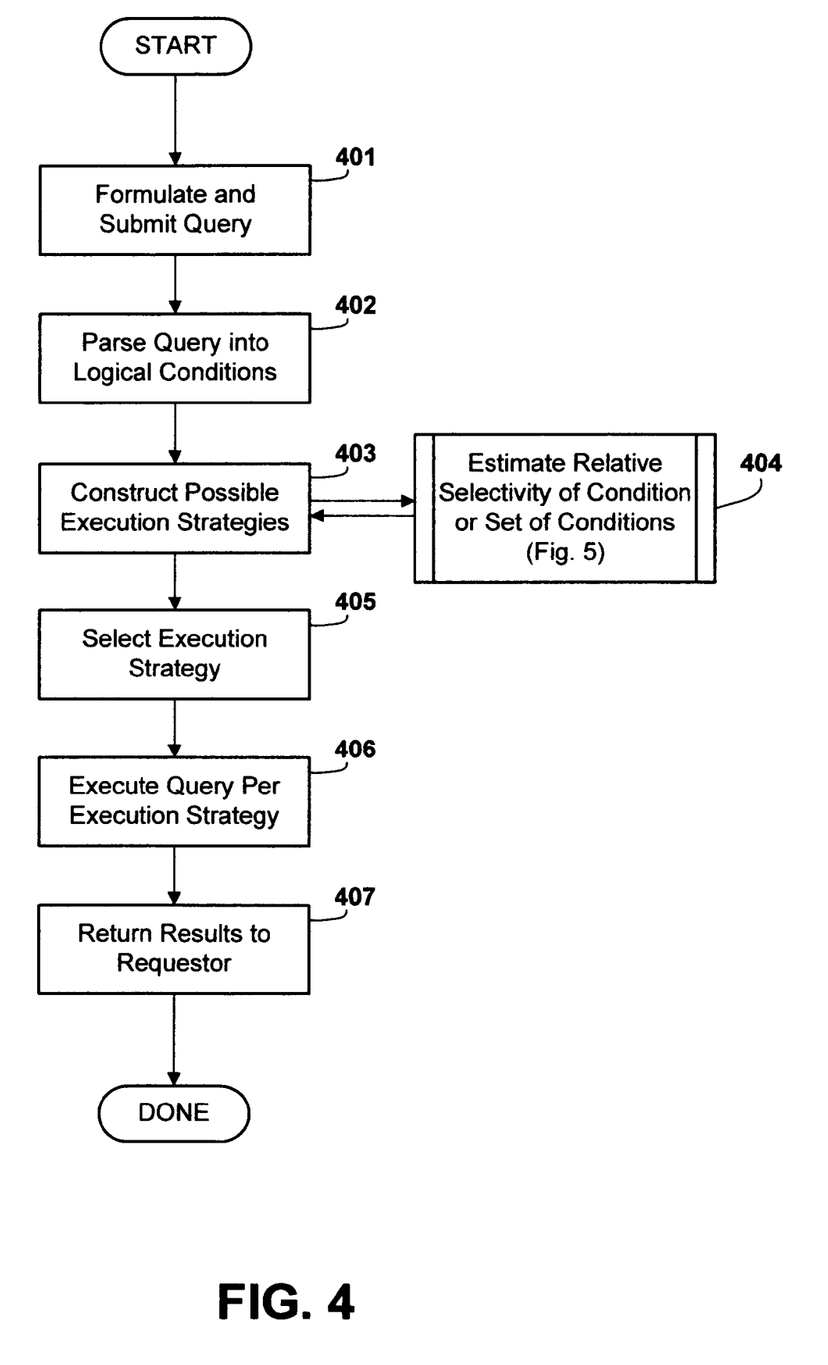
FIG. 4 is a flow diagram illustrating at a high level the process of executing a database query, according to the preferred embodiment
Figure 5:
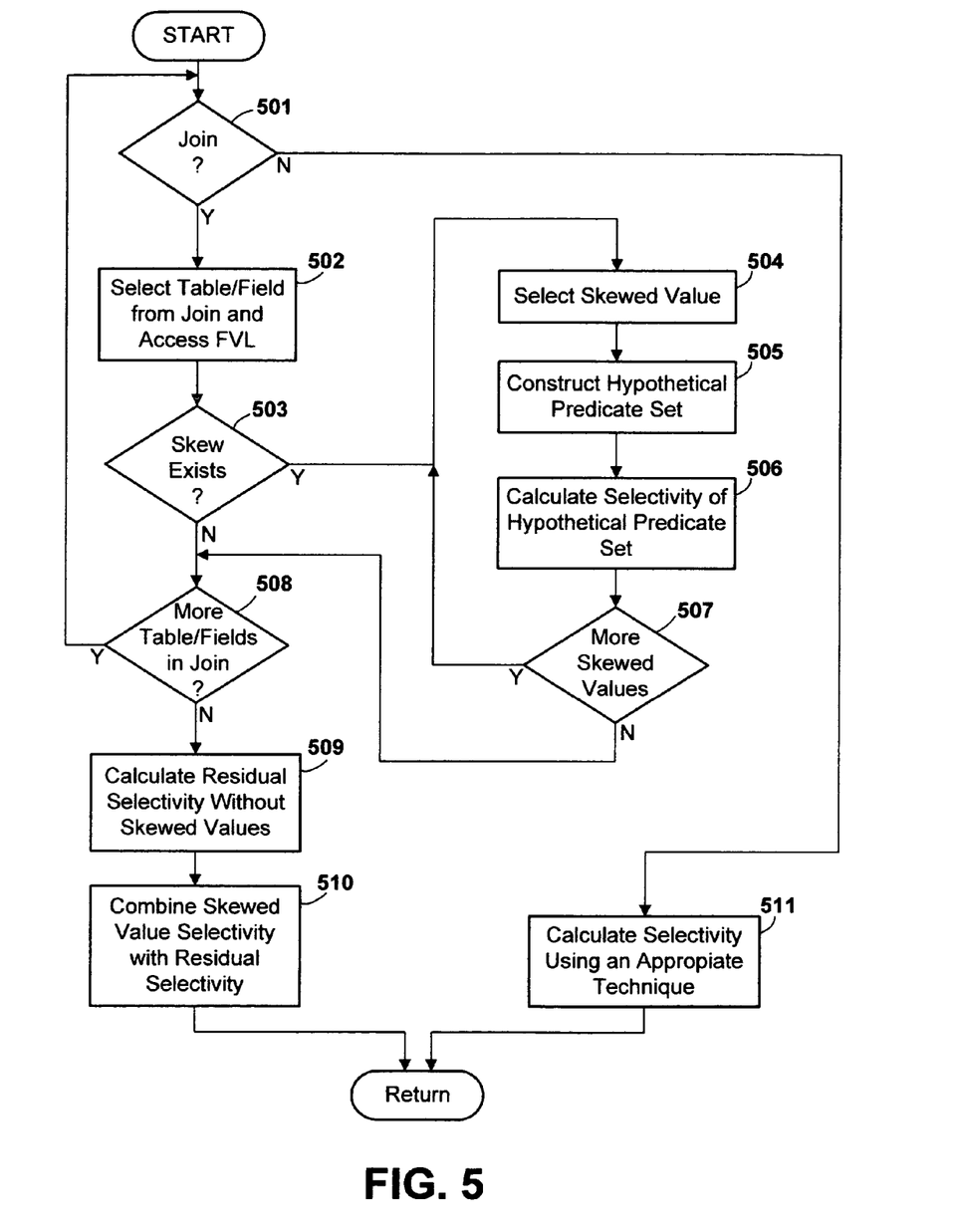
FIG. 5 is a flow diagram showing in greater detail the process of estimating the selectivity of a query condition or conditions within the process of FIG. 4, according to the preferred embodiment.
Figure 6:
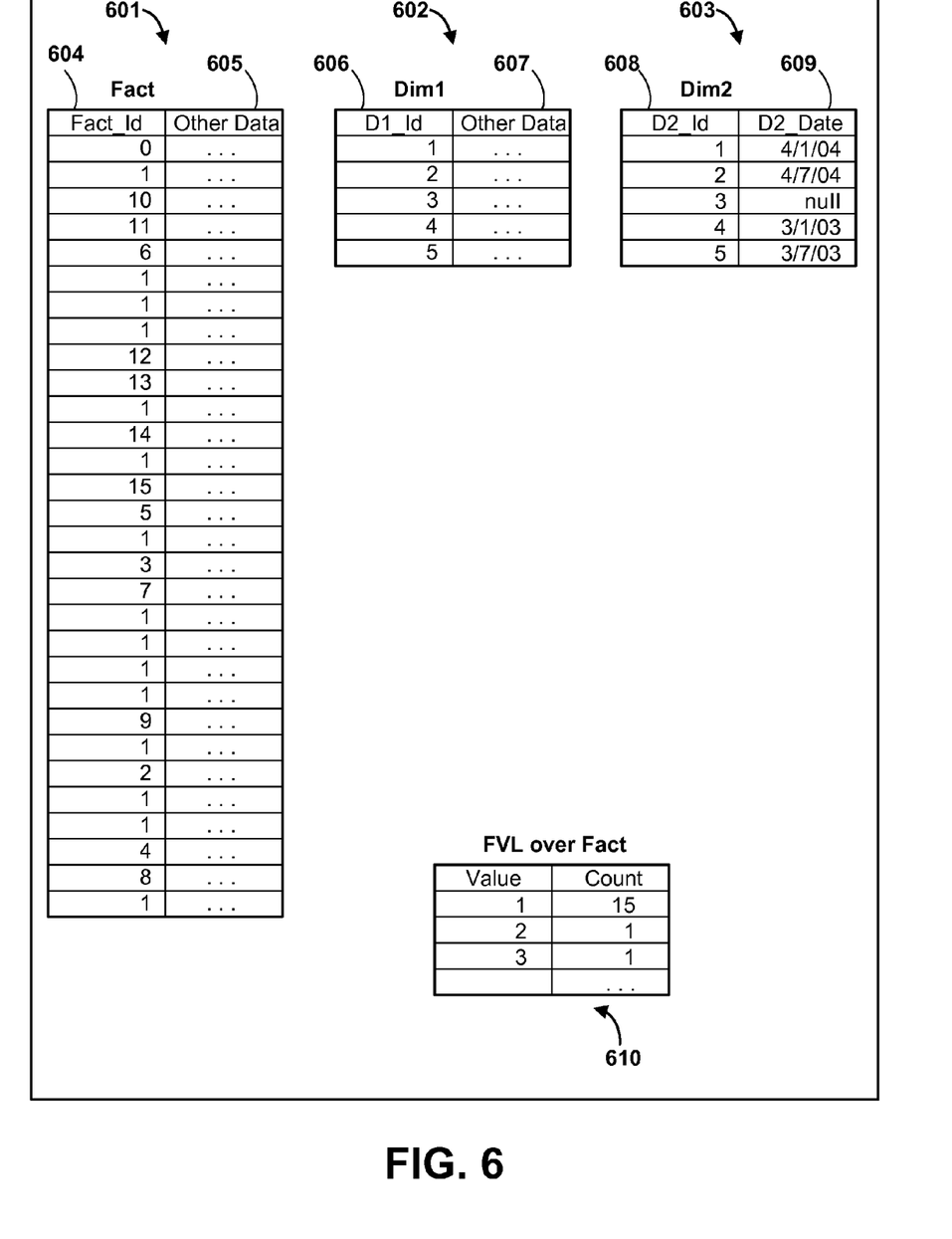
FIG. 6 is an example of a portion of a database illustrating the application of the technique for predicting the selectivity of query conditions, according to the preferred embodiment.

The amount of time required to perform a complex query on a large database can vary greatly, depending on many factors, such as the order of evaluation, whether indexing is used, and so forth. In order to determine the best execution strategy from among multiple potential alternatives, the system should be able to accurately predict the selectivity of the various conditions of the query. In accordance with the preferred embodiment of the present invention, in a query containing at least one join condition (i.e., at least one condition which compares data from multiple tables), a result set size for a set or subset of query conditions is predicted by determining whether substantial data skew exists in any of the table fields which are part of the join condition. Data skew is identified as one or more values having a disproportionately large frequency of occurrence, i.e., above some skew threshold. If data skew is identified, the system constructs, for each skewed value (i.e., for each value above the threshold), a hypothetical query predicate in which the reference to the table field exhibiting data skew is replaced with a constant equal to the frequently occurring ("skewed") value. The database management system then predicts the size of the result set for each of the hypothetical query predicates. Preferably, this is done by accessing an index for each remaining field to determine the precise selectivity, although any appropriate prediction technique can be used. Preferably, the database management system also predicts a result set size for the original query, in which the skewed values are removed from consideration. The result set size for each of the hypothetical predicates is then added to the result set size of the query in which the skewed values are removed, to obtain a composite prediction of result set size for the original query. In the exemplary embodiment, prediction of result set size is performed on behalf of a query optimizer for purposes of determining an optimal query execution strategy from among multiple possible execution strategies. However, there could be other applications of a technique or facility which predicts the result set size of a query or sub-query, such as for purposes of system resource management, providing a pre-execution cost estimate, etc. FIGS. 4 and 5 are flow diagrams illustrating the process of executing a database query, according to the preferred embodiment, FIG. 5 in particular representing the process of estimating selectivity of a condition or conditions in a query. Furthermore, FIG. 6 illustrates a set of simplified example data for the application of this technique to a pair of example queries.

Referring to FIG. 4, a high-level view of a process of executing a database query utilizing the predictive technique herein is illustrated. A requesting user formulates and submits a database query using any of various techniques now known or hereafter developed (step 401). E.g., the database query might be constructed and submitted interactively using a query interface in database management system 221, might be submitted from a separate interactive query application program, or might be embedded in a user application and submitted by a call to the query engine 222 when the user application is executed. A query might be submitted from an application executing on system 100, or might be submitted from a remote application executing on a different computer system. In response to receiving the query, query engine 222 parses the query into logical conditions to generate a query object (step 402), which may be saved for re-use. As an alternative to formulating, saving and parsing a new query, a user might select a previously parsed and saved query for re-submission.

Database management system 221 invokes optimizer 222 to generate an optimized execution strategy for the query. In order to determine an optimized execution strategy, the optimizer may need to know the selectivity of various conditions or subsets of conditions in a query, i.e., the number of responses (in the form of records, record pairs, tuples, etc.) which satisfy a condition or subset of conditions. The query engine typically generates multiple potential execution strategies (step 403), and tests each potential strategy by evaluating the size of the result set of different conditions or different subsets of conditions from the original query (step 404). The estimate of the size of the result set might be performed by the optimizer or some other facility in the database management system. Estimating the size of the result set may be performed iteratively for different conditions or permutations of conditions. Estimating the result set size (selectivity) for a condition or set of conditions is depicted in FIG. 4 as step 404, and shown in greater detail in FIG. 5, explained below.

After generating various execution strategies and evaluating the expected selectivity of conditions of the strategies, the query optimizer selects a suitable execution strategy from among those generated (step 405), using the selectivities of conditions to predict the costs of different strategies. The system may determine a suitable execution strategy in accordance with any of various techniques, now known or hereafter developed, which use a prediction or estimation of the relative selectivity of various conditions within the query to determine an optimal strategy.

After determining a suitable execution strategy, the query engine executes the query in accordance with the strategy previously determined (step 406). The query engine then generates and returns results in an appropriate form (step 407). E.g., where a user issues an interactive query, this typically means returning a list of matching database entries for display to the user. A query from an application program may perform some other function with respect to database entries matching a query.

Referring to FIG. 5, a method for estimating the selectivity of a query condition or set of query conditions (which could be a complete query or subset thereof) is illustrated. The system determines whether the query conditions include any joins (step 501). If there is no join condition, the 'N' branch is taken to step 511, and any appropriate method, now known or hereafter developed, may be used to estimate the selectivity of the non-join conditions (step 511). If a join is involved, the 'Y' branch is taken to step 502. As is well known in the art, a join is a logical condition requiring comparison of values derived from multiple database tables. A join condition may be represented in a generalized abstract form as:

$$Fn1(fieldn, fieldm, \ldots) <relation> Fn2(fieldp, fieldq \ldots) \qquad (1)$$

where Fn1 and Fn2 are functions of values from respective database fields, and the fields are from multiple database tables. Commonly, a single field from one table is compared directly with a single field from another, the relation often being an equality, i.e.:

$$X.f1 = Y.f2 \qquad (2)$$

where X and Y are different tables. This is the form of join condition in the examples explained herein. However, it should be borne in mind that join conditions are not necessarily limited to the equality relation, or to only one field from each respective table.

If a join condition exists, the system selects one of the tables and fields represented in the join condition, and accesses the frequent value list corresponding to the selected table and field (step 502). The system then determines whether certain skewed values exist within the FVL (step 503). If no skewed value exists, the system continues to step 508, to consider other table and field pairs within the join condition. If at least one skewed value exists, the system continues to step 504, and selects one of the skewed values.

A "skewed value" could be any value having a large and/or disproportionate frequency of occurrence (particularly, a disproportionately high frequency of occurrence) among records in the database table. Any of various techniques or criteria could be used for selected a skewed value. In accordance with the preferred embodiment, where a single field from a first table is compared to a value derived from a second table, the skewed values for the single field of the first table are selected from the FVL corresponding to that table and field. Only certain skewed values are selected. Specifically, to be selected, a skewed value must meet a minimum occurrence threshold and a minimum proportion threshold, both of which are preferably pre-determined, fixed quantities. The minimum occurrence threshold is a number of records containing the skewed value in the selected field of the applicable table. The minimum proportion threshold is a percentage (e.g., 25%) of the total number of records in the applicable table which contains the skewed value in the selected field. In the preferred embodiment, the FVL is constructed by sampling, as explained earlier. The database management system preferably records the size of each table (number of records in each table). From the known sample size of the FVL, it is possible to extrapolate a number of records containing a particular value for purposes of determining whether the minimum occurrence threshold is met as:

(Number of occurrences in FVL)×(Table size)/(FVL sample size)

The minimum proportion threshold is met if the number of occurrences in the FVL meet the minimum proportion of the sample size of the FVL.

Although skew usually implies disproportion, in the preferred embodiment the selected "skew values" are those which are frequently occurring, and therefore might significantly affect the prediction of result set sizes. It will be noted that, for a field having a very low cardinality (i.e., very few discrete values), it is possible that all the values will be considered skewed and that selected skewed values are not necessarily disproportionate.

The technique described above is applicable to the use of single values, as in the join condition $$X.f1 <\text{relation}> Y.f2 \quad (3)$$

I.e, in this condition, the FVLs corresponding to fields X.f1 and Y.f2 are examined and any skewed values are selected. However, in the more general case, each side of the relation could be a function of multiple fields, as in the generalized join condition (1) above. In this case, it is desirable to find skewed values of the functions F1(fieldn,fieldm . . . ) and F2(fieldp,fieldq . . . ). As a very simple example, the join condition might be:

$$X.f1 = Y.f2 * Y.f3 \quad (4)$$

In this case, the FVL for field X.f1 can be used to find skewed values of that field, as described above. But in order to replace the join with a hypothetical predicate (as described further below), one should find identify skew values, if any, of the product Y.f2*Y.f3. One method for doing this is to separately identify frequently occurring values of Y.f2 and Y.f3 from the respective FVLs of Y.f2 and Y.f3, generate all product permutations of the frequently occurring values, and assume that the frequency of each permutation is the product of the frequencies of the individual values. This method may work well where there are relatively few values and permutations, and where there is little correlation between values of Y.f2 and Y.f3. As an alternative, it would be possible to construct a special FVL for the product Y.f2*Y.f3 by accessing a random sample of records, and using this special FVL to select any skewed values, and/or to maintain an FVL over Y.f2, Y.f3, and compute the product as necessary.

The techniques for selecting skew values described herein are simply some of many possible techniques, and it would alternatively be possible to use any of various other possible techniques or criteria, including those using different data structures. For example, an index might be used in place of a FVL for selecting skewed values.

After selecting a skewed value for the selected table and field, the system constructs a set of hypothetical query predicates from the original set of query conditions (step 505). Each hypothetical predicate corresponds to a respective one of the original query conditions. The hypothetical predicate is constructed from the corresponding original query condition by replacing the field having the selected skewed value (or a value equal to it) with a constant equal to the selected skewed value.

The system then calculates the selectivity of the query corresponding to the selected skewed value (step 506). Preferably, this is accomplished by separately calculating the selectivity of each hypothetical predicate and combining them appropriately. As described herein, the hypothetical query predicates have replaced values from different tables in a join with a constant, and therefore the hypothetical query predicates no longer include joins, but are simply logical conditions involving single table analysis. Numerous conventional techniques exist for evaluating the selectivity of such a logical conditions, any of which may be suitably used for determining the selectivity of a hypothetical predicate herein. In the preferred embodiment, where the hypothetical predicate references a single field, the index for the corresponding field (if it exists) is used to determine the number of records satisfying the hypothetical predicate. The index is preferred over the FVL, because a value which occurs infrequently might not be contained in the FVL at all (the FVL being a set of sampled values), but it will be present in the index. However, because a skewed value from another field is involved, if there is even one occurrence of the value satisfying the hypothetical predicate in the corresponding field, then there could be a large number of records of some other table which satisfy the query. Where no index is available, an FVL, histogram, or other appropriate technique could be used to estimate selectivity of the hypothetical predicate.

The selectivities of multiple hypothetical predicates of a set corresponding to a selected skewed value are combined to construct a selectivity for the skewed value. E.g., where each of the original conditions is connected to one another by the logical 'AND', then the selectivity of the combined set of hypothetical predicates is the product of the individual selectivities. Where a conjunctive operator other than 'AND' is used, an appropriate formula may be used for generating a combined selectivity.

If there are any more skewed values of the table and field selected at step 502, then the 'Y' branch is taken from step 507, the system selects a next skewed value at step 504, and evaluates its selectivity as described above. When all skewed values of the table and field selected at step 502 have been evaluated, the 'N' branch is taken from step 507 to step 508.

At step 508, if there are more table and field combinations in the join condition which have not yet been analyzed, the system takes the 'Y' branch to select the next table/field at step 502. The system continues to examine table and field combinations until a transitive closure of the join is reached. For example, wherein the condition is:

X.f1=Y.f1 AND Y.f1=Z.f1, it will be necessary to select X.f1, Y.f1 and Z.f1 to reach transitive closure of the join. When all fields in the join condition have been examined for skewed values, the 'N' branch is taken to step 509.

The system then calculates the residual selectivity of the original set of conditions. The residual selectivity is the selectivity of the non-skewed values, i.e., the selectivity calculated by assuming that any records containing skewed values have been removed from the tables (step 509). In the preferred embodiment, this is accomplished by using the FVL data modified by removal of the skewed values. Any appropriate estimation technique for estimating selectivity of a join, now known or hereafter developed, can be used with the modified FVL data to estimate the residual selectivity. In particular, because skewed values have already been accounted for, techniques which assume a random distribution of the remaining non-skewed values are acceptable, and in fact, because of their simplicity, are preferred. In the preferred embodiment, an approximate measure of selectivity of a join condition is the minimum of the cardinality of each joined table divided by the product of the cardinalities, i.e.

$$\text{Selectivity} = \text{MIN}(\text{Card}X, \text{Card}Y \ldots)/(\text{Card}X * \text{Card}Y * \ldots), \quad (5)$$

where CardX is the cardinality of table X (i.e., the number of discrete values in table X), it being understood that other formulae could alternatively be used. This selectivity is applied to the cartesian product after local selection of any additional logical conditions (other than the join) to determine a composite selectivity for the set of query conditions.

The selectivity corresponding to each respective skewed value (computed at step 506) is then added to the residual selectivity of the non-skewed values (computed at step 509) to obtain a composite selectivity for the original set of query conditions (step 510). The system returns this composite selectivity value to a requesting process (such as an optimizer generating multiple possible query strategies, as shown in FIG. 4 at step 403).

The technique described herein with respect to FIG. 5 above may be further appreciated by reference to the example simplified portion of a database of FIG. 6. Referring to FIG. 6, a database contains tables "Fact" 601, "Dim1" 602, and "Dim2" 603. Fact table 601 contains field "Fact_Id" 604, and various other data 605 (which could be multiple fields). Dim1 table 602 contains field "D1_Id" 606, and various other data 607 (which could also be multiple fields). Dim2 table 603 contains fields "D2_Id" 608 and "D2_Date" 609. Associated with table 601 and field 604 is frequent value list 610, i.e., frequent value list 610 contains discrete values found in field 604, and corresponding counts (frequencies) of those values.

The following example queries are defined for the database shown in FIG. 6:

Q1: Select * from Fact, Dim1, Dim2 Where Fact.Fact_Id= Dim1.D1_Id AND Dim1.D1_Id=Dim2.D2.Id AND Dim2.D2_Date Between '1/1/04' and '12/31/04' AND Fact.Fact_Id<99

Q2: Select * from Fact, Dim1, Dim2 Where Fact.Fact_Id= Dim1.D1_Id AND Dim1.D1_Id=Dim2.D2.Id AND Dim2.D2_Date Between '1/1/03' and '12/31/03' AND Fact.Fact_Id<99

If prior art estimation formula (5) is applied to either Q1 or Q2, then the selectivity of the join conditions Fact.Fact_Id=Dim1.D1_Id and Dim1.D1_Id=Dim2.D2_Id is estimated as:

$$\text{MIN}(\text{CardFact}, \text{CardDim1}, \text{CardDim2})/(\text{CardFact}*\text{CardDim1}*\text{CardDim2}) = 5/(16*5*5) = 0.0125$$

This is then combined with the selectivity of the local conditions:

Fact.Fact_Id<99 (Selectivity=30/30=1)

Dim2.D2_Date Between '1/1/04' and '12/31/04' (Selectivity=2/5=0.4)

Dim2.D2_Date Between '1/1/03' and '12/31/03' (Selectivity=2/5=0.4)

For both Q1 and Q2, this yields a composite selectivity of 0.0125*1*0.4, or 0.005. When applied to the theoretical result set (the product of the table sizes) of 30*5*5=750, this selectivity would predict approximately 3.75 records satisfying the conditions of the queries.

This prior art prediction would be reasonably accurate if the values in Fact table 601 were evenly distributed, but they are not. The value '1' appears 15 times in the field Fact_Id. As a result, Q1, which selects the records containing D2._Id of '1' or '2', returns 16 responses (fifteen in which Fact_Id='1' and one in which Fact_Id='2'), more than four times the predicted response using the prior art formula. On the other hand, Q2 returns only two responses, somewhat less than the prediction.

According to the preferred embodiment of the present invention, FVL 610 is examined at step 502, and it is determined that field Fact_ID 604 contains the skewed value '1'. For Q1, the following hypothetical predicates are constructed at step 505:

Fact.Fact_Id='1' AND Fact.Fact_Id<99      (6)

Dim1.D1_ID='1'      (7)

Dim2.D2_Id='1' AND Dim2.D2_Date Between '1/1/04' and '12/31/04'      (8)

At step 506, the system determines the number of responsive records to the combination of the hypothetical predicates using any appropriate technique. The preferred technique is to obtain an actual count of records in the non-skewed table(s) using an index. In the example, it is easy to see that exactly one record satisfies each of hypothetical predicates (7) and (8). In the general case, these tables will be much larger, and an index will be useful for finding any skewed values. Since 15 records satisfy predicate (6), the number of responsive records is calculated as 15*1*1, or 15. The number 15 is taken from the FVL. In the example, this is an exact count. In the more general case, the FVL is itself derived by sampling so the number of responsive records containing the skewed value is an estimate. It is desirable to obtain an exact count of records satisfying the hypothetical predicates of any non-skewed table (i.e., predicates (7) and (8)), because even a value of 1, when multiplied by a very skewed value in another table, can yield a large result. However, it is not important to obtain an exact count of the responsive records in the table having the skewed value, i.e. Fact table 601.

The selectivity associated with the skewed value is the number of responsive records divided by that portion of the theoretical result set attributable to the skewed value, i.e.:

$$15/(CardSkew*CardDim1*CardDim2)=15/(15*5*5)=0.04$$

The system then calculates the residual selectivity associated with the non-skewed values using formula (5), modified as if the skewed values were removed from Fact table 601 (step 509), i.e.:

$$ResidualSel = \frac{MIN((CardFact - CardSkew), CardDim1, CardDim2)}{(CardFact - CardSkew)*CardDim1*CardDim2} \quad (9)$$

$$= 5/((16-1)*5*5) = .013$$

The selectivity of the join is calculated at step 510 as the sum of the selectivity associated with the skewed value and the residual selectivity, i.e. 0.053. The composite selectivity of the set of hypothetical conditions is the join selectivity combined with the selectivity of the local conditions, i.e. 0.53*1*0.4=0.0212. When applied to the theoretical result set of 750, this yields a predicted results size of 750*0.0212=15.9. As can be seen, this is very close to the actual number of results, i.e. 16.

If the same methodology is applied to Q2, the same skew value is detected at step 502, and the following hypothetical predicates are constructed at step 505:

$$Fact.Fact\_Id='1' \text{ AND } Fact.Fact\_Id<99 \quad (10)$$

$$Dim1.D1\_ID='1' \quad (11)$$

$$Dim2.D2\_Id='1' \text{ AND } Dim2.D2\_Date \text{ Between } '1/1/03' \text{ and } '12/31/03' \quad (12)$$

Hypothetical predicates (10) and (11) are identical to (6) and (7) analyzed previously. Predicate (12) is similar to (8). However, in this case, if an index of table 603 is examined to find any values having D2_Id='1', it will be determine that none of these records have a Dim2.D2_Date field between '1/1/03' and '12/31/03', and therefore the number of records satisfying hypothetical predicate (11) is zero. The number of responsive records is therefore 15*1*0=0, and the selectivity attributable to the skewed value is zero.

The residual selectivity is computed as in equation (9) above. The join selectivity is therefore the residual selectivity, i.e. 0.013. This is combined with the selectivity of the local conditions to obtain a composite selectivity of 0.013*1*0.4=0.0033. When applied to the theoretical result set of 750, the selectivity predicts a result set size of 750*0.0033=2.5 records. The actual number of responsive records is 2. Thus, even where the skewed value is not selected, this produces a better estimate than the prior art formula.

It will be understood that the example database portion of FIG. 6 is greatly simplified for illustrative purposes, and that an actual database would typically have a much larger number of entries. Furthermore, as explained above, an FVL is generally constructed by sampling techniques, and does not contain exact counts of values.

The predictive technique of the present invention is intended to improve prediction accuracy in an average or typical case. It can not be proved to always produce a better prediction that prior art techniques, and there are likely to be circumstances in which the estimate produced according to the preferred embodiment of the present invention is not as accurate as desired. But in general, it is believed that the predictive technique of the present invention will be more accurate than prior art techniques which assume a uniform distribution of values over an entire database table. Furthermore, it will be understood that, in the general case, a join condition might have arbitrary complexity. The present invention is not necessarily intended as a perfect analytical tool for all possible queries. Accordingly, the techniques described herein are intended for analysis of typical query join conditions. There may be queries of such unusual complexity that it is not practical to use techniques described herein for predictive analysis.

Among the advantages of the technique described herein as a preferred embodiment is the relatively low overhead of implementation. In accordance with the preferred embodiment, existing frequent value lists and existing database table indexes are used for identifying skewed values and analyzing hypothetical predicates. These are conventional structures which typically are already being maintained in many large databases, and hence no additional maintenance burden is required. Furthermore, for typical join queries as in the examples given above, no extensive sampling or analysis is required to construct the hypothetical predicates and evaluate the selectivity of the conditions.

Although a particular technique for identifying skewed values and evaluating selectivity of a set of conditions is described herein, many alternative approximation techniques are possible in addition to those specifically mentioned above are possible. Additionally, in the preferred embodiment described above, analysis of query conditions is described as a series of steps in a particular order. However, it will be recognized by those skilled in the art that the order of performing certain steps may vary, and that variations in addition to those specifically mentioned above exist in the way particular steps might be performed. In particular, the manner in which queries are written, parsed or compiled, and stored, may vary depending on the database environment and other factors, and it may be possible to present the user with intermediate results during the evaluation phase.

As used herein, "selectivity" is intended to encompass any suitable quantitative measure of the response to a query condition or set of conditions. A "selectivity" can be expressed as a proportion or percentage of some larger quantity (such as a theoretical result set), or can be expressed as a number of responses, or some other appropriate measure. When expressed as a number of responses, it is also referred to as a result set or size of a result set.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of computer-readable media used to actually carry out the distribution. Examples of computer-readable media include, but are not limited to, media such as volatile and non-volatile memory devices, floppy disks, hard-disk drives, CD-ROM's, DVD's, magnetic tape, and so forth. Moreover, the invention applies to any form of computer-readable media in which a program product is stored either at its source, destination, or intermediate location, regardless of the form of distribution, and in particular even where distributed using communications links, including wireless communications links, which do not involve a physical transfer of tangible media. An example of computer-readable media is illustrated in FIG. 1 as system memory 102, and as data storage devices 125-127.

Although a specific embodiment of the invention has been disclosed along with certain alternatives, it will be recognized by those skilled in the art that additional variations in form and detail may be made within the scope of the following claims:

What is claimed is:

1. A method for predicting the selectivity of a set of at least one logical query condition for querying a database, said at least one logical query condition comprising at least one join condition for joining multiple tables of said database, comprising the steps of:

automatically identifying at least one skewed value for a first field of said database specified in said at least one join condition;

for each skewed value identified by said step of automatically identifying at least one skewed value, automatically constructing a corresponding set of one or more hypothetical query predicates, each hypothetical query predicate of said set of hypothetical query predicates corresponding to a respective query condition of said set of at least one logical query condition, wherein each respective said hypothetical query predicate is constructed by replacing each occurrence of said first field in the corresponding query condition with a constant equal to the skewed value corresponding to the set of hypothetical query predicates containing the hypothetical query predicate;

automatically predicting a respective selectivity for each said set of hypothetical query predicates; and automatically predicting a composite selectivity for said set of at least one logical query condition using the respective selectivity for each said set of hypothetical query predicates, wherein said step of automatically predicting a composite selectivity for said set of at least one logical query condition comprises automatically predicting a residual selectivity for said set of at least one logical query condition, said residual selectivity being predicted as a selectivity of a hypothetical database which does not contain said skewed values, and automatically combining said residual selectivity with said respective selectivity for each said set of hypothetical query predicates to produce said composite selectivity.

2. The method of claim 1, wherein said method is performed by a database management system for purposes of determining an optimum query execution strategy for executing a logical query of said database.

3. The method of claim 1, wherein said step of automatically identifying at least one skewed value for a first field comprises automatically accessing a frequent value list containing sampled values from said first field, and automatically identifying any sampled values exceeding at least one pre-determined threshold.

4. The method of claim 3, wherein said step of automatically identifying any sampled values exceeding at least one pre-determined threshold comprises automatically identifying any sampled values exceeding at least two pre-determined thresholds, a first of said pre-determined thresholds representing a number of occurrences of said sampled value, and a second of said pre-determined thresholds representing a proportion of records containing said sampled value among all records in a database table containing said first field.

5. The method of claim 1, wherein said residual selectivity is calculated as a quotient, the numerator of said quotient being the minimum of a plurality of adjusted cardinalities, each adjusted cardinality being a representation of cardinality of a respective database table joined by said at least one join condition less a number of skewed values, if any, identified in the respective database table by said identifying step, and the denominator of said quotient being the product of said plurality of adjusted cardinalities.

6. The method of claim 1, wherein said step of automatically predicting a respective selectivity for each said set of hypothetical query predicates comprises automatically accessing at least one respective index for each of at least one hypothetical query predicate, and automatically predicting a number of records satisfying each said at least one hypothetical query predicate using said respective index.

* * * * *